Jan. 18, 1966 M. H. LEWIN 3,230,384

LOGIC CIRCUITS EMPLOYING NEGATIVE RESISTANCE ELEMENTS

Filed June 25, 1959 2 Sheets-Sheet 1

CURVES FOR CIRCUIT OF FIG. 6

INVENTOR.
MORTON H. LEWIN
BY John V. Regan
ATTORNEY

LOGIC CIRCUITS EMPLOYING NEGATIVE RESISTANCE ELEMENTS

Filed June 25, 1959 2 Sheets-Sheet 2

INVENTOR.
MORTON H. LEWIN
BY John V. Regan
ATTORNEY

United States Patent Office 3,230,384

Patented Jan. 18, 1966

3,230,384

LOGIC CIRCUITS EMPLOYING NEGATIVE RESISTANCE ELEMENTS

Morton H. Lewin, Princeton, N.J., assignor to Radio Corporation of America, a corporation of Delaware Filed June 25, 1959, Ser. No. 822,872
28 Claims. (Cl. 307—88.5)

The present invention relates generally to electronic circuits using negative resistance diode elements, and particularly to such circuits which are useful as logical elements in electronic data processing machines.

Logical elements are circuits of the building block type which can be represented by operators in an appropriate system of symbolic logic. These elements are extensively used in electronic data processing systems, such as digital computers, in switching systems, and so on. Some of the more commonly used logical elements are known as "or"-circuits, "not"-circuits and "inhibitor" circuits, and have been constructed utilizing vacuum tubes, transistors and semiconductor diodes. However, these prior circuits still have problems with respect to one or more of speed, size and complexity when used in present day systems. The above problems can be appreciably reduced by using diodes having a negative resistance characteristic. By constructing logical elements with such diodes, high speed, low cost and reliable circuits of reduced size are obtained.

It is an object of the present invention to provide improved high speed logical elements for digital computers or other digital information handling machines.

Another object of the present invention is to provide improved logical elements which are fast, reliable in operation and have low power requirements.

Still another object of the present invention is to provide novel "not"-circuits, "exclusive or" circuits and "inhibitor" circuits.

According to the invention, a first circuit branch includes a negative resistance diode and a second circuit branch includes a second negative resistance diode and an impedance element connected in series. The first and second circuit branches are connected in parallel between a pair of junctions, with each of the diodes poled in the same direction between the junctions. Energizing signals and binary input signals may be applied between the junctions and a desired output signal derived from across the impedance element.

The invention affords various types of logic circuits, for example, a "not" circuit, an exclusive "or" circuit, an inhibitor circuit, and may assume various forms which perform these different functions in highly advantageous ways.

Figure 1:
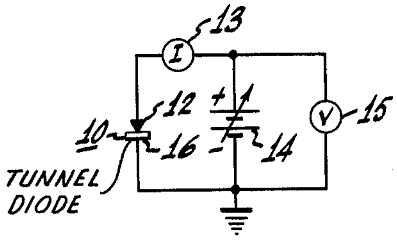
FIGURES 1 and 4 are simplified schematic diagrams of circuits utilizing negative resistance diodes, and are useful in explaining the operation of the present invention.

FIGURE 1 shows a negative resistance diode 10 having an anode electrode 12 connected through an ammeter 13 to the positive terminal of a variable voltage bias battery 14 with the negative terminal of the battery connected to circuit ground. The cathode electrode 16 of the diode 10 is also connected to ground thereby forward biasing the diode. A voltmeter 15 is connected across the battery 14 to measure the voltage across the diode as a function of the current through it.

Figure 2:
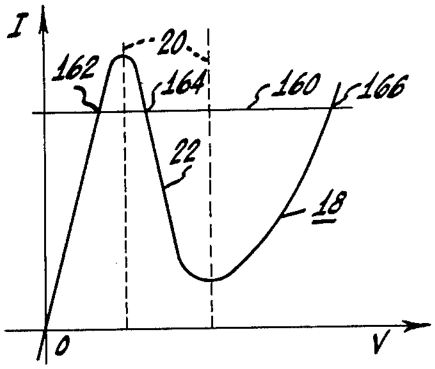
FIGURES 2 and 5 are graphs of the volt-ampere characteristics of the circuits of FIGURES 1 and 4.

FIGURE 2 is a graph of the volt-ampere characteristic 18 of the forward biased diode 10 shown in FIGURE 1 and utilized in the present invention. The characteristic curve 18 in FIGURE 2 is a plot of the voltage across the diode 10 in the circuit of FIGURE 1 as a function of the current through it, measured as indicated in FIGURE 1. The region between the dotted lines 20 in FIGURE 2 demarcates a portion 22 of the curve 18 having a negative resistance. This negative resistance portion 22 is interposed between two positive resistance portions. The two positive resistance operating regions are in different voltage ranges, one higher than the other. Accordingly, when the diode is operating in the lower voltage positive resistance region as, for example, at the intersection 162 of constant current load line 160 and curve 18, it is said to be in its "low voltage state," and when the diode is operating in its higher voltage positive resistance operating region as, for example, at the intersection 166 of load line 160 and the curve, it is said to be in its "high voltage state." Classically, a negative resistance device of this type, that is, one which can assume one of two possible stable voltages at a given level of input current, is known as a "voltage controlled" negative resistance device. A specific semiconductor type diode having such a characteristic is a "tunnel" diode.

Figure 3:
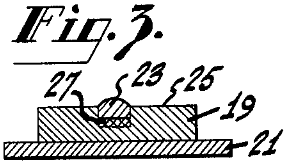
FIGURE 3 is a sectional view of one form of negative resistance diode which may be used in practicing the invention.

FIGURE 3 shows a sectional view of one form of tunnel diode which may be fabricated as follows: A single crystal bar of n-type germanium is doped with arsenic to have a donor concentration of $4.0 \times 10^{19}$ cm.$^{-3}$ by methods known in the semiconductor art. This doping may be acomplished, for example, by pulling a crystal from molten germanium containing the requisite concentration of arsenic. A wafer 19 is cut from the bar along the 111 plane, i.e. a plane perpendicular to the 111 crystallographic axis of the crystal. The wafer 19 is etched to a thickness of about two mils with a suitable etch solution. A major surface of this wafer 19 is soldered to a strip 21 of nickel, with a suitable, known lead-tin-arsenic solder, to provide a non-rectifying contact between the wafer 19 and the strip 21. The nickel strip 21 serves eventually as a base lead. A five mil diameter dot 23 of 99 percent by weight indium, 0.5 percent by weight zinc and 0.5 percent by weight gallium is placed with a small amount of a commercial flux on the free surface 25 of the germanium wafer 19 and then heated at 450° C. for one minute in an atmosphere of dry hydrogen to alloy a portion of the dot to the free surface 25 of the wafer 19, and then cooled rapidly. In the alloying step, the unit is heated and cooled as rapidly as possible so as to produce an abrupt p-n junction 27. The unit is then given a final dip etch for five seconds in a slow iodide etch solution, followed by rinsing in distilled water. A suitable slow iodide etch is prepared by mixing one drop of a solution comprising 0.55 gram potassium iodide, and 100 cm.$^3$ water in 10 cm.$^3$ of a solution comprising 600 cm.$^3$ concentrated nitric acid, 300 cm.$^3$ concentrated acetic acid, and 100 cm.$^3$ concentrated hydrofluoric acid. A pigtail connection may be soldered to the dot where the device is to be used at ordinary frequencies. Where the device is to be used at high frequencies, contact may be made to the dot with a low impedance lead. In a 50 ohm line, the unit can be switched from the low voltage to the high voltage state or from the high to the low voltage state in less than 2 millimicroseconds. Tunnel diodes are also described by L. Esaki in an article published in the Physical Review, volume 109, page 603 (1958).

Figure 4:
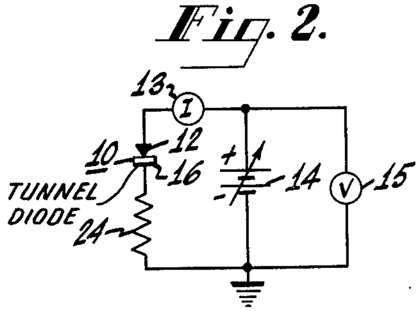
Figures 5, 6, 7:
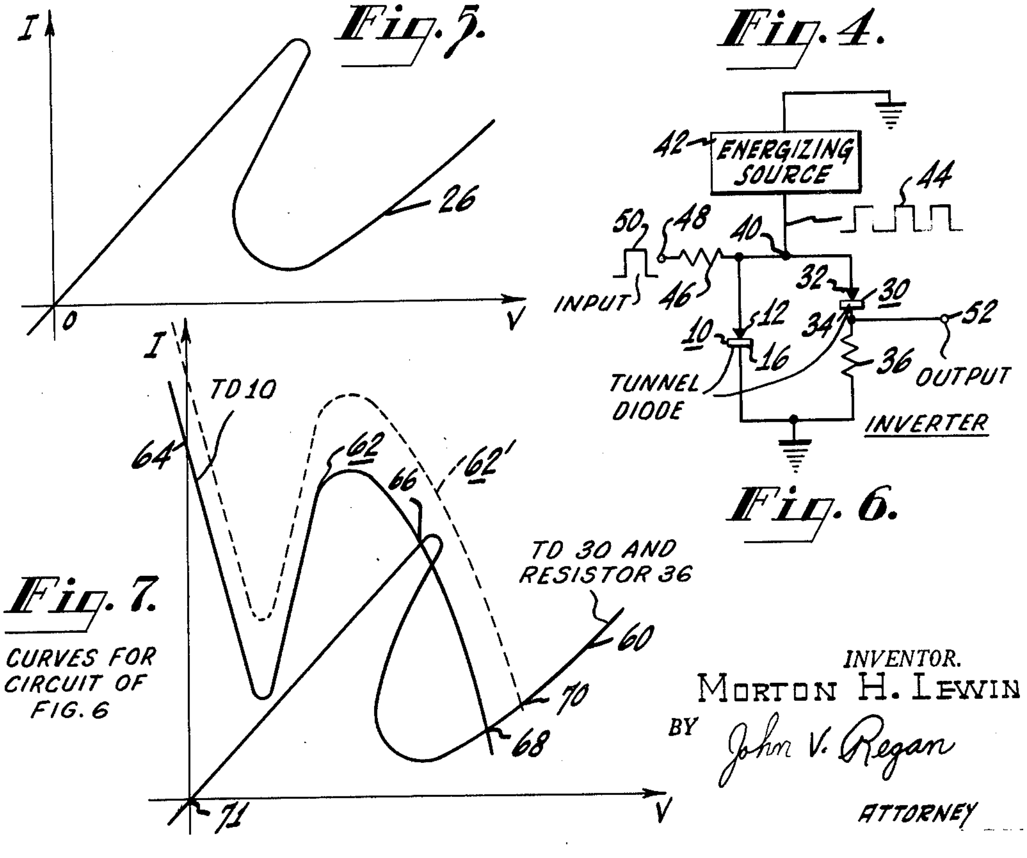
FIGURE 6 is a schematic circuit drawing of an inverter circuit or a "not"-circuit in accordance with the present invention.
FIGURE 7 is a graph of the volt-ampere characteristics of the circuit of FIGURE 6.

FIGURE 4 shows the tunnel diode 10 with a small resistance 24 inserted in series therewith and the combination connected through an ammeter 13 across a variable voltage bias battery 14 so that the tunnel diode is again forward biased. The resistance 24 is selected to be approximately equal to the average value of the negative resistance represented by the slope of the portion 22 of the curve 18 over the central portion of the region 20. The composite volt-ampere characteristic of the circuit of FIGURE 4 is obtained by varying the voltage across the diode and its series resistor 24 and measuring the current through them, and the voltage across them as indicated in FIGURE 4. The resultant curve 26 is shown in FIGURE 5. The effect of the additional series resistance 24 is to increase the initial slope of the curve 26 and to restrict the negative resistance portion to two small segments occurring near the corresponding respective maximum and minimum points of the curve.

FIGURE 6 utilizes, in combination, the circuits shown in FIGURES 1 and 4 to obtain an inverter circuit or a "not"-circuit in accordance with the present invention. The inverter circuit of FIGURE 6 utilizes the tunnel diode 10 as a load impedance element for a second tunnel diode 30 and its resistor 36. The cathode electrode 16 of the tunnel diode 10 is connected directly to circuit ground and the cathode electrode 34 of the tunnel diode 30 is connected to circuit ground through the series resistor 36. The anode electrodes of both tunnel diodes 10 and 30 are directly connected together at a common junction 40. A source of energizing signals 42 is connected to the common junction 40. One terminal of an input resistor 46 is also connected to the junction 40, with the remote end of the resistor connected to a signal input terminal 48. A binary input signal, such as illustrated by the waveform 50, is applied to this input terminal. An inverter output signal is then derived from a terminal 52 connected with the ungrounded end of the resistor 36.

In place of the battery type power supplies shown in the circuits discussed heretofore, a pulse type energizing supply source 42 is used in the circuit of FIGURE 6. Energizing pulses such as are illustrated by the waveform 44 are applied by the pulse source 42 to the common junction 40. Since the tunnel diodes are essentially low impedance devices when forward biased, it is preferable that the source 42 be of the constant-current type. In addition, if the inverter circuit of FIGURE 6 is to be cascaded with other circuits of the tunnel diode type, means are provided to insure that the binary signals are transferred between the circuits in the desired direction. That is, since one terminal of the tunnel diode serves as both an input and an output terminal, means are provided for making the circuit directional so that the binary signals propagate from the output of one such circuit to the input of a succeeding circuit, and not vice versa. One method of achieving the desired directional effect is to separate input and output functions in time by use of a sequential energizing system. Thus, a pulsed type power supply is used in place of the battery type supplies shown heretofore. The method of utilizing a pulse type power supply to provide directional signal propagation will be more fully apparent from the description of the circuit operation.

The graph of FIGURE 7 is a plot of the operating volt-ampere characteristics of the two branches of the circuit of FIGURE 6. The curves 60 and 62 of FIGURE 7 correspond to the curves 26 and 18 respectively of FIGURES 2 and 5. The curve 60 represents the volt-ampere characteristic of the tunnel diode 30 and its series resistor 36, and the curve 62 represents the volt-ampere characteristic of the tunnel diode 10 which acts as a load impedance element in this circuit. Accordingly, the curve 62 is inverted and shifted vertically in the graph of FIGURE 7 as compared to its position in the graph of FIGURE 2. This transposition of the curve 62 is similar to that obtained, for example, when drawing a load line on the graph of a vacuum tube characteristic.

The curve 62 intersects the current axis at a point 64, which is determined by the amplitude of the energizing pulses 44. By varying the amplitude of the energizing pulses, the curve 62 can be shifted vertically to control the manner in which the curves 60 and 62 intersect. The amplitude of the energizing pulses may be controlled by any suitable means (not shown) within the pulse energizing source 42.

To obtain inverter operation, the amplitude of the energizing pulses 44 is adjusted so that only the two stable intersection points 66 and 68 occur between the curves 62 and 60. The intersection points occur in the positive resistance regions of the curves and are therefore stable operating points. The positive resistance regions are defined as those regions of the curves 18 and 26 of FIGURES 2 and 5 having positive slopes as drawn in those figures. Stable operation cannot occur in regions of negative resistance. The intersection point 66 corresponds to an operating condition in which relatively high current flows through the diodes 10 and 30 and the resistor 36, while the intersection point 68 corresponds to a condition in which a relatively low current flows therein. Accordingly, when the stable point of operation is the point 66, a relatively high voltage appears across the resistor 36. This high voltage output corresponds to the presence of one binary digit, for example a binary "one" output signal at the terminal 52. When the stable point of operation is at the point 68, a relatively low current flows through the tunnel diodes 10 and 30 and the resistor 36, thereby generating a relatively low voltage corresponding to a binary "zero" at the output terminal 52.

In the absence of an input signal at the terminal 48 or an energizing pulse at the junction 40, the operating point of the circuit may be considered to be the point 71 at the origin of the graph of FIGURE 7. Assume now that an energizing pulse 44 is applied to the junction 40 by the pulse energizing source 42. Assume also that a binary "zero" signal is applied to the input terminal 48 of the inverter circuit concurrently with the energizing pulse 44. A binary "zero" input signal is represented either by the total absence of a voltage pulse, or by the presence of a voltage pulse having an amplitude less than a given value. Under these conditions, the circuit operating point shifts rapidly from the point 71 and assumes the stable operating point 66. As can be seen from FIG. 7, at operating point 66, diode 10 is in its high voltage state and diode 30 is in its low voltage state. Accordingly, terminal 40 in the circuit is at a relatively high voltage, a relatively high current flows through the tunnel diode 30 and the resistor 36 and a relatively high voltage pulse appears across the resistor 36 to cause a binary "one" signal to appear at the output terminal 52. At the termination of the input signal and the energizing pulse, the operating point shifts rapidly back to the point 71. Thus, a binary "zero" input signal results in a binary "one" output signal.

When a binary "one," such as a pulse 50 of amplitude larger than the given value, is applied to the input terminal 48 concurrently with an energizing pulse 44, then additional current is supplied to the junction 40 by this binary "one" input signal. This additional input current rapidly shifts the load curve 62 in the vertical direction to the position shown by the dotted curve 62', and the stable operating condition then rapidly shifts from the point 71 to a point 70. As can be seen from FIG. 7, at operating point 70 diode 10 is in its high voltage state and diode 30 is also in its high voltage state. The voltage at terminal 40 is slightly greater than that present when an energizing pulse and binary zero input signal are applied to the diode. However, as can also be seen in FIG. 7 at operating point 70 the current through the branch circuit consisting of diode 30 and output resistor 36 is relatively low, so that the voltage across the resistor, that is, between terminal 52 and ground, is relatively low, corresponding to a binary "zero" signal. At the termination of the input pulse and the energizing pulse, the operating point rapidly shifts back to the point 71. Thus, a binary "one" input signal results in a binary "zero" output signal. The circuit therefore acts as an inverter or "not" circuit.

Figures 8, 9, 10:
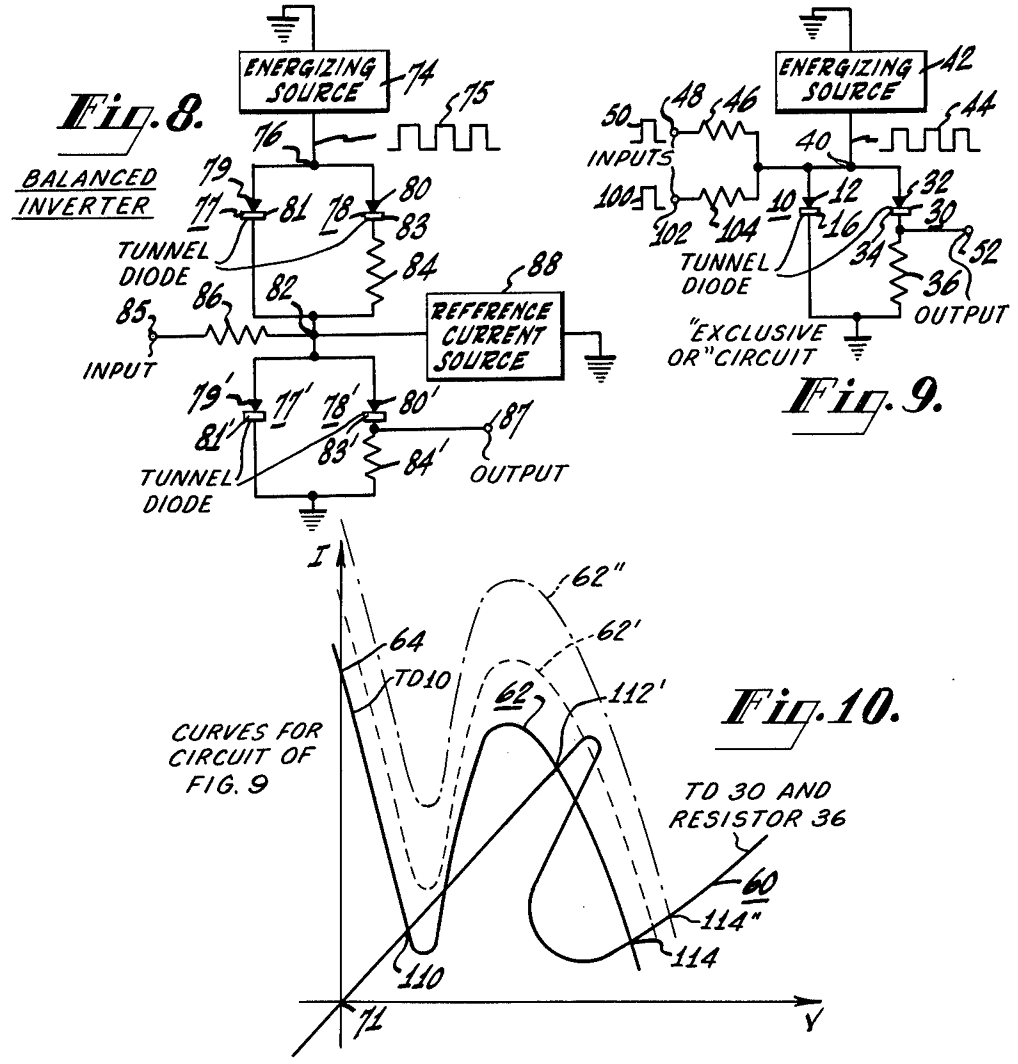
FIGURE 8 is a schematic circuit diagram of a balanced-inverter circuit or "not"-circuit in accordance with the present invention.
FIGURE 9 is a schematic circuit diagram of an exclusive "or" circuit or an inhibitor circuit in accordance with the present invention.
FIGURE 10 is a graph of the volt-ampere characteristics of the circuit of FIGURE 9.

The inverter circuit shown in FIGURE 6 may be termed a single ended inverter. Its effective operation has been found to rely on the accurate determination of the operating points 66 and 68. Another type of inverter circuit, termed a balanced inverter, is shown in FIGURE 8. This balanced inverter circuit utilizes a pair of the single-ended inverters of FIGURE 6 to provide decreased sensitivity to operating point changes due to variations in the energizing signal amplitude.

In the circuit of FIGURE 8, the two single-ended inverter circuits are connected in series, but with only a single energizing source 74 and the input and output differently arranged. The energizing source 74 delivers constant voltage energizing signals, such as those shown by the waveform 75 to a junction 76. A pair of diodes 77 and 78 have their respective anode electrodes 79 and 80 connected to the junction 76. The cathode electrode 81 of the tunnel diode 77 is connected to another junction 82 and the cathode electrode 83 of the tunnel diode 78 is also connected through a resistor 84 to this junction 82. Connected to the junction 82 and in series with this first portion of the circuit as described is a second circuit of like configuration with similar parts identified by primed numerals. The cathode electrode 81' and one terminal of the resistor 84' of the second circuit are connected to circuit ground. Binary input signals are applied to an input terminal 85 which is connected with the junction 82 by a resistor 86. An output signal is obtained from a terminal 87 connected with the ungrounded end of the resistor 84'. A reference current source 88 is also connected to the junction 82. The current source 88 may be a constant-current source arranged to apply a reference current of suitable polarity to the junction 82. It is only necessary that the reference current be applied during the time that input signals are applied to the circuit.

In operation of the balanced inverter circuit, a pulse type energizing signal 75 is applied to the junction 76. Each input signal is applied to the terminal 85 concurrently with an energizing pulse 75. The inversion function in a balance inverter circuit arranged as in FIGURE 8 is achieved by causing the current into the junction 82 to be of positive polarity when the input signal is a binary "one" and to be of negative polarity when the input signal is a binary "zero." Thus, the reference current is applied to the junction 82 is of negative polarity. If the input signal is a positive pulse corresponding, for example, to a binary "one," the net current flowing into the junction 82 is positive if the input current due to the binary "one" is greater in amplitude than the negative reference current. This net positive current causes the lower half of the circuit, denoted by the primed numerals, to move to an operating point which provides a low voltage output signal at the output terminal 87 corresponding to the binary "zero" digit. If the input signal is a binary "zero," the net curent flowing into the terminal 82 is negative thereby causing the lower half of the circuit to move to an operating point which provides a high voltage or a binary "one" signal at the output terminal 87. Thus inverter operation is also obtained with the balanced inverter circuit.

The single-ended binary circuit is also utilized to provide two other types of logical elements, namely an exclusive "or" and an inhibitor circuit.

A schematic circuit diagram of an exclusive "or" circuit is shown in FIGURE 9. The circuit diagram is similar to that shown and described heretofore in FIGURE 6 with the addition of another input terminal 102 and resistor 104 for applying a second binary input signal to the circuit. The second input signal, which may be a binary "zero" or a binary "one" as shown by the waveform 100, is applied to the terminal 102 from any suitable source (not shown). An input resistor 104 connects the second input terminal 102 and the junction 40.

An exclusive "or" circuit sometimes called an anti-coincidence circuit, operates to produce an output signal on the application of a pulse to any one of the two input terminals, but produces no output when there is no input pulse, and no output when two coincident pulses are provided.

A graph of the volt-ampere characteristic of the circuit of FIGURE 9 is illustrated in FIGURE 10. The two curves 60 and 62 of FIGURE 10 have been previously described in conection with FIGURE 7. As previously noted, the curve 60 represents the volt-ampere characteristic of the tunnel diode 30 and series resistor 36, and the curve 62 represents the volt-ampere characteristic of the tunnel diode 10. In the case of an exclusive "or" circuit, the amplitude of the energizing pulses 44 are adjusted so that the curves 60 and 62 intersect at three stable points 110, 112 and 114. Note that the inverter circuit of FIGURE 6 requires only two stable intersection points, whereas the present circuit requires three such stable points.

In the absence of an energizing pulse and any of the input signals, the operating point of the circuit may again be considered to be the point 71 at the origin of the graph. In operation, binary input signals are applied to the input terminals 48 and 102, and concurrently therewith, an energizing current pulse 44 is applied to the junction 40 by the pulse source 42. If both binary input signals are "zeros," that is, if the input signals are either absent, or are of an amplitude less than the given value described hereinafter, then the stable operating condition shifts rapidly from the point 71 to the point 110. As can be seen from the drawing, at operating point 110, diodes 10 and 30 are both in the low voltage state, so that the voltage at junction 40 is relatively low, the current through the diode 32 and resistor 36 is relatively low, and a relatively low output voltage corresponding to a first of the circuit conditions is obtained at the output terminal 52. At the termination of the input signals and the energizing pulse, the circuit operating point rapidly shifts back to the point 71. If now an energizing pulse 44 is applied to the junction 40 and at this time one of the input pulses is a binary "one" while the other input pulse is a binary "zero," sufficient additional current is applied to the junction 40 by the binary "one" input signal to shift, in effect, the curve 62 vertically as indicated by the dashed curve 62' so that there is no longer an intersection at the point 110. The stable operating point of the circuit then shifts rapidly from the point 71 to the point 112'. As can be seen from FIGURE 10, at the operating point 112', diode 10 has switched to its high voltage state, whereas diode 32 remains in its low voltage state. Thus, the voltage at terminal 40 increases, the current through the diode 32 and resistor 36 is relatively high, and a relatively high voltage appears at terminal 52. The given amplitude for the presence of both input signals then is determined by the amount of upward shift in the curve 62 at which the lower, left intersection is still obtained. At the termination of the input signals and the energizing pulse, the operating point rapidly shifts from the point 112′ back to the point 71. When both of the input signals applied to the terminals 48 and 102 are binary "ones," and concurrently therewith an energizing pulse is applied to the junction 40, there is then sufficient input current effectively to shift the curve 62 upward as indicated by the dot-dash curve 62″ so that there is then only one stable intersection point, which occurs at the point 114″. The operating point of the circuit therefore rapidly shifts from the point 71 to the point 114″. At the operating point 114″, diodes 10 and 30 are both in the high state, the current through diode 30 and resistor 36 is relatively low, corresponding to the first circuit condition, and the voltage at output terminal 52 is relatively low. At the termination of all the signals, the operating point rapidly shifts back to the point 71.

Therefore, a relatively high voltage occurs when, and only when, the two binary input signals are different. When they are both the same, i.e. both present, or both absent, a relatively low voltage output is produced. The high and low voltage outputs correspond respectively to the binary digits "one" and "zero."

The circuit of FIGURE 9 may also be utilized as an inhibitor circuit. An inhibitor circuit is a gate circuit in which signals on a certain input terminal, called the inhibiting terminal, prevents the passage of signals applied to any one or more of the other input terminals. In other words, a signal is produced at an output terminal when signals are applied to one of the input terminals unless at the same time there is a signal present on the inhibiting terminal to prevent passage of the input signal.

In FIGURE 9, let the terminal 48 represent the input terminal and let the terminal 102 represent the inhibit terminal. In the inhibitor circuit, a signal applied to the inhibiting terminal 102 always results in a binary "zero" signal at the output terminal 52. When there is no inhibit signal, that is, when the inhibit signal corresponds to a binary "zero," then a binary "zero" or binary "one" applied to the input terminal 48 results in a binary "zero" or a binary "one," respectively, at the output terminal 52.

The circuit operation may be explained by again referring to the graph of FIGURE 10. The amplitude of the energizing pulse 44 is adjusted so that the three stable operating points 110, 112 and 144 are again obtained. The operating point which the inhibitor circuit actually assumes is determined by the net value of the energizing signals 44 and the signals applied to the input termination 48 and the inhibiting terminal 102.

In operation, the circuit is arranged so that if a binary "zero" signal is applied to the input terminal 48 and an energizing pulse 44 is applied concurrently to the junction 40, there is then only sufficient net current applied to shift the circuit operating point from the point 71 to the point 110. At the point 110 the current flowing through the load resistor 36 is relatively low and therefore a binary "zero" is obtained at the output terminal 52. Thus a binary "zero" input signal results n a binary "zero" at the output terminal, in the absence of an inhibit signal. At the terminantion of the applied signals, the operating point shifts back to the point 71.

If a binary "one" signal is applied to the input terminal 48 and an energizing pulse 44 is applied concurrently to the junction 40, there is then sufficient net current applied to the junction 40 to shift the curve 62 in the upward direction so that there is no longer an intersection at the point 110. The stable operating point now occurs at the point 112′. At the point 112′, the current through the resistor 36 is relatively high and a binary "one" signal is thereby obtained at the output terminal 52. Thus, a binary "one" input signal results in a binary "one" output signal in the absence of an inhibit signal. At the termination of the applied signals, the operating point returns to the origin.

If now an inhibit pulse, such as indicated by the waveform 100, is applied to the inhibiting terminal 102, the signal appearing at the output terminal 52 is a binary "zero" regardless of whether the input is a binary "zero" or a binary "one." This inhibit function can be achieved by either of two methods.

In a first method, the inhibiting pulse 100 may be a large amplitude pulse which, when applied to the inhibiting terminal 102 always shifts the circuit operating condition to the point 114, independently of whether a binary "zero" or a binary "one" is applied to the input terminal 48. In other words, the inhibit signal is sufficiently large when added to the energizing current from source 42 to switch both of diodes 10 and 30 to the high state. In this case, the output signal at the terminal 52 corresponds to a binary "zero" signal.

In the second method, the inhibiting pulse is of relatively small amplitude, which in combination with an energizing pulse 44 and a binary "zero" input signal always shifts the circuit operation from the point 71 to the other low voltage operating point 110. At the point 110, the output signal again corresponds to the binary "zero" signal. However, the small amplitude inhibiting pulse in combination with an energizing pulse 44 and a binary "one" input signal applies sufficient net current to the junction 40 to shift the circuit operation from the point 71 to the point 114″. The operating point 114″ also corresponds to a binary "zero" output signal. The signal amplitudes are therefore arranged so that in the presence of an inhibiting pulse the circuit does not stabilize at the point 112′ whereas in the absence of an inhibiting pulse, a binary one input pulse added to an energizing pulse causes circuit operation at operating point 112′. Therefore, the inhibit function is obtained for both methods.

Figure 11:
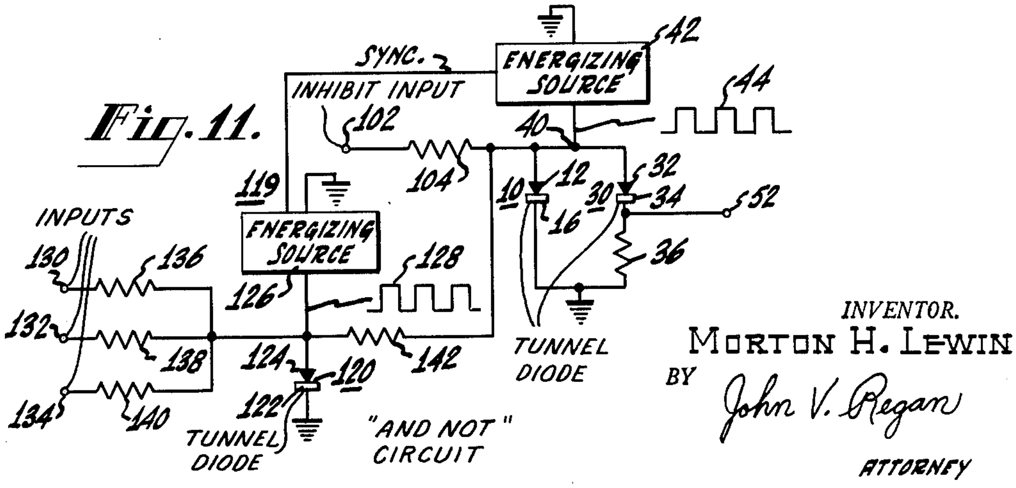
FIGURE 11 is a schematic circuit diagram of another embodiment of an inhibitor circuit in accordance with the present invention.

The circuit of FIG. 11 includes an "and" gate 119 followed by an inverter such as shown in FIG. 6. The inverter inncludes an inhibiting input terminal 102. The Boolean equation for the "and" gate is $ABC=D$ where A, B, and C are inputs to the "and" gate and D is the output of the "and" gate. The Boolean equation for the inverter is $\overline{DE}=F$ where E is the inhibit input and F is the output appearing at output terminal 52. In the absence of an inhibit signal, the Boolean equation for the complete circuit of FIG. 11 is $\overline{ABC}=F$ which is equivalent to $\overline{A}+\overline{B}+\overline{C}=F$. This circuit is commonly known as an "and not" or "nand" circuit. In the presence of a signal applied to the inhibit terminal 102, the output F is "zero" regardless of the values of the inputs A, B, and C. Therefore, the complete expression for the circuit is $(\overline{A}+\overline{B}+\overline{C})\overline{E}=F$.

The "and"-gate circuit 119 comprises a tunnel diode 120 with its cathode electrode 122 connected to circuit ground and its anode electrode 124 connected to an energizing source 126. The energizing source 126 is arranged to supply essentially pulse type energizing signals indicated by the waveform 128 in synchronism with the pulse signals from the energizing source 42. The connection 129 indicates the synchronizing connection between the sources 42 and 126.

The two energizing sources 42 and 126 may be of the same type. The three binary input signals are applied to the three input terminals 130, 132 and 134, respectively. These input termials are all connected to the anode electrode 124 of the tunnel diode 120 by resistors 136, 138 and 140, respectively. The output signal from the "and"-gate 119 is coupled to the common junction 40 of the inhibitor circuit by a resistor 142.

Referring again to FIGURE 2, the operation of the "and"-gate circuit 119 may be explained. The curve 18 of this figure shows the volt-ampere characteristic of the tunnel diode 120. If the energizing source 126 applies substantially constant current energizing pulses to the tunnel diode, a substantially horizontal load line 160 is obtained and intersects the curve 18 in three points, namely 162, 164 and 166. The points 162 and 166 occur in positive resistance regions of the curve 18 and are therefore stable, while the point 164 occurs in a negative resistance region and is unstable.

By properly adjusting the amplitude of the energizing signals, the circuit is arranged to operate as an "and" gate. In the absence of an energizing signal or of any binary input signals, the circuit operating point may be considered to be at the origin of the graph of FIGURE 2. If an energizing pulse only is applied to the tunnel diode 120 by the energizing source 126, the operating point rapidly shifts to the point 162, corresponding to a binary "zero" output signal. However, if one or more binary input signals are applied to the input terminals 130, 132 and 134, sufficient additional input current is supplied to the tunnel diode 120 to shift the load line 160 above the peak of the curve 18 thereby causing a rapid transition of the operating point from the point 162 to the point 166. A binary "one" output signal is thereupon obtained from the tunnel diode 120. In this manner "and" operation is obtained.

The "and" gate circuit thus provides an input signal to the inhibitor circuit when and only when, a separate binary "one" signal is applied concurrently to each of the input terminals 130, 132 and 134. That is, the tunnel diode 120 of the "and" circuit is operated so that an energizing signal 128 from the source 126 must be applied thereto during the presence of the three binary "one" input signals to cause a relatively large amplitude, voltage output signal to be applied to the junction 40 of the inhibitor circuit. In the absence of one or more of the three binary input signals, the "and" gate 119 applies a relatively low amplitude, voltage signal to the junction 40. In all other respects, the operation of the circuits of FIGURES 8 and 10 are similar.

An inhibitor circuit for a plurality of inputs also may be obtained in a circuit utilizing an "and"-gate and a "not"-gate, such as the "not"-gate of FIGURE 6. That is, an inhibitor circuit may be obtained by cascading a "note"-gate with an "and"-gate in such a manner that the output signal from the "not"-gate is applied as one of the input signals to the "and"-gate. In such case, separate energizing signals are required for both the "not"-gate and the "and"-gate, and these energizing signals are displaced relative to each other. That is, the "not"-gate portion of the circuit is energized a predetermined time before the "and"-gate portion of the circuit. The inhibitor circuit of FIGURE 11, on the other hand, has the advantage that the energizing signals may be applied at the same time to both portions of the inhibitor circuit, thus simplifying power supply problems.

What is claimed is:

1. In combination, a first branch circuit including solely a first negative resistance device, a second branch circuit including a second negative resistance device and an impedance element connected in series, a pair of terminals between which said first and said second circuits are connected in parallel, each of said devices being poled in the same sense from one of said terminals to the other, and a pair of output terminals connected across said impedance element.

2. In combination, a first circuit including solely a first voltage controlled negative resistance device, a second circuit including a second voltage controlled negative resistance device and an impedance element connected in series, and a pair of terminals between which said first and said second circuits are connected in parallel, each of said devices being poled in the same sense from one of said terminals to the other, means for applying energizing signals between said terminals, said energizing signals being poled to forward bias said devices, and means for deriving an output signal from across said impedance.

3. In combination, a first circuit including solely a first voltage controlled negative resistance device, a second circuit including a second voltage controlled negative resistance device and an impedance element connected in series, a pair of terminals between which said first and said second circuits are connected in parallel, each of said devices being poled in the same sense from one of said terminals to the other, means for applying energizing signals and input signals between said terminals, said energizing signals and said input signals being poled to forward bias said devices, and means for obtaining an output signal from said impedance element.

4. In the combination as set forth in claim 3, further including a third voltage controlled negative resistance device, means for switching said third device to its high and low voltage state, and means for applying the output signal of said third device between said terminals.

5. A logic circuit comprising, in combination, a first circuit including a first negative resistance semiconductor device, a second circuit including a second negative resistance semiconductor device and a first impedance element connected in series, a first and second terminal between which said first and second circuits are connected in parallel, a third circuit including a third negative resistance semiconductor device, a fourth circuit including a fourth negative resistance semiconductor device and a second impedance element connected in series, a third and a fourth terminal between which said second and third circuits are connected in parallel, and means connecting said second and third terminals, each of said devices being poled in the same sense from said first terminal to said fourth terminal.

6. A logic circuit comprising, in combination, a first circuit including a first negative resistance semiconductor device, a second circuit including a second negative resistance semiconductor device and a first impedance element connected in series, a first and an second terminal between which said first and second circuits are connected in parallel, a third circuit including a third negative resistance semiconductor device, a fourth circuit including a fourth negative resistance semiconductor device and a second impedance element connected in series, a third and a fourth terminal between which said second and third circuits are connected in parallel, means connecting said second and third terminals, each of said devices being poled in the same sense from said first terminal to said fourth terminal, means for applying energizing signals between said first and fourth terminal, means for applying an input signal and a reference signal to said second and third terminals, and means for deriving an output signal from said second impedance element.

7. In combination, a pair of branch circuits connected in parallel between a pair of input terminals, one said branch circuit including solely a first voltage controlled negative resistance diode and the other including, in series, a second voltage controlled negative resistance diode and impedance, said diodes being poled to conduct current in the same direction between said terminals, and each said diode being capable of assuming one of two stable voltage states; a pair of output terminals across said impedance; and means for applying a forward current to said input terminals in an amount to place said first diode in its high voltage state and said second diode in its low voltage state, whereby when an additional forward current of greater than a given amplitude is applied to said terminals said second diode switches to its high voltage state and the voltage at said output terminals is relatively low, and when an additional forward current of less than said given amplitude is applied to said terminals, said second diode remains in its low voltage state and the voltage at said output terminals is relatively high.

8. In combination, a pair of branch circuits connected in parallel between a pair of input terminals, one said branch circuit including solely a first voltage controlled negative resistance diode and the other including, in series, a second voltage controlled negative resistance diode and impedance, said diodes being poled to conduct current in the same direction between said terminals, and said diodes being capable of assuming one of two stable voltage states; a pair of output terminals across said impedance; and means for applying a forward operating current to said input terminals in an amount to place said first diode in a higher current region of its low voltage state and said second diode in a lower current region of its low voltage state, whereby said first diode can be switched to a lower current region of its high voltage state and said second diode to a higher current region of its low voltage state in response to an additional forward current of one value, and said second diode can be switched to a lower current region of its high voltage state in response to an additional forward current of a higher value.

9. In combination, a pair of branch circuits connected in parallel between a pair of input terminals, one said branch circuit including solely a first voltage controlled negative resistance diode and the other including, in series, a second voltage controlled negative resistance diode and impedance, said diodes being poled to conduct current in the same direction between said terminals, and each said diode having high and low voltage states; a pair of output terminals across said impedance; means for applying a forward current to said input terminals in an amount to place both of said diodes in their low voltage state; and means for applying an inhibit current to said input terminals in an amount sufficient, when added to said operating current, to switch both of said diodes to their high voltage state, whereby in the absence of an inhibit current said first diode can be switched to its high voltage state and said second diode maintained in its low voltage state in response to a forward signal current of one value, whereas in the presence of an inhibit current both of said diodes are switched to their high voltage state.

10. In combination, a pair of branch circuits connected in parallel between a pair of input terminals, one said branch circuit including solely a first voltage controlled negative resistance diode and the other including, in series, a second voltage controlled negative resistance diode and impedance, said diodes being poled to conduct current in the same direction between said terminals, and each said diode having high and low voltage states; a pair of output terminals across said impedance; means for applying a forward curent to said input terminals in an amount to place both of said diodes in their low voltage state; and means for applying an inhibit current to said input terminals in an amount sufficient, when added to said operating current to increase the current through both diodes but insufficient to switch either diode to its high voltage state, whereby in the absence of an inhibit current said first diode can be switched to its high voltage state, and said second diode maintained in its low voltage state in response to a forward signal current of given value, whereas in the presence of an inhibit pulse said forward signal current of given value switches both of said diodes to their high voltage state.

11. A logic circuit comprising, two branch circuits connected in parallel between a pair of input terminals, one circuit including solely a single voltage controlled negative resistance element, and the other including a second voltage controlled negative resistance element in series with a resistor, the two elements being poled to conduct forward current in the same direction; means for applying forward operating current across said terminals; means for applying information current pulses across said terminals; and a pair of output terminals across said resistor.

12. A logic circuit comprising, two branch circuits connected in parallel, one including solely a single diode, and the other including a tunnel diode in series with a resistor, the two diodes being poled to conduct forward current in the same direction; input terminals between which said parallel circuits are connected for applying forward operating current to said diodes; means for applying information current pulses across said terminals; and a pair of output terminals across said resistor.

13. A logic circuit comprising, two branch circuits connected in parallel, one including solely a single tunnel diode, and the other including a second tunnel diode in series with a resistor, the two diodes being poled to conduct forward current in the same direction; a pair of input terminals between which said parallel circuits are connected for applying forward operating current to both of said diodes; means for applying information current pulses across said terminals; and a pair of output terminals across said resistor.

14. A logic circuit comprising, in combination, two branch circuits connected in parallel between a pair of input terminals, one including solely a first diode, and the other including a voltage controlled negative resistance second diode in series with a resistor, the two diodes being poled to conduct forward current in the same direction; means for applying forward operating current across said terminals at a voltage level such that the negative resistance second diode is in the higher current region of its low voltage state and the branch circuit including the negative resistance second diode and resistor draws substantially more current than the first diode; means for applying forward information pulses to said terminals at a level to switch said negative resistance second diode to a lower current region of its high voltage state; and a pair of output terminals across said resistor.

15. A logic circuit comprising, two branch circuits connected in parallel between a pair of input terminals, one including an element which simulates a relatively low value of impedance constant voltage source over at least a portion of its operating range of input currents, and the other including a voltage controlled negative resistance element in series with a resistor; means for applying an operating current across said terminals; means for applying information current pulses across said terminals; and a pair of output terminals across said resistor.

16. A logic circuit comprising, two branch circuits connected in parallel between a pair of input terminals, one including a voltage controlled negative resistance diode having high and low voltage states in series with a resistor, and the other including an element having an impedance in at least one portion of its operating range which is sufficiently low, at one level of current applied between said terminals, to cause the negative resistance diode operates in a higher current region of its low voltage state and, at a second level of current applied between said terminals, to cause the negative resistance diode to operate in a lower current region of its high voltage state; means for applying a first current across said terminals at said one level; means for applying a second current across said terminals which, added to said first current, is equal to said second level of current; and a pair of output terminals connected across said resistor.

17. A logic circuit comprising, two branch circuits connected in parallel, one including an element which simulates a relatively low value of impedance constant voltage source over at least a portion of its operating range of input currents, and the other including a voltage controlled negative resistance element in series with a circuit element for producing an output signal; a pair of input terminals across which said branch circuits are connected for applying an operating current to said branch circuits; and means for applying current pulses to said terminals for controlling the state of said negative resistance element and thereby controlling the portion of said operating current steered into each of said branch circuits and the amplitude of said output signal.

18. In a circuit comprising a tunnel diode exhibiting a potential-current characteristic defining a first region of positive resistance over a low range of potentials and adjoining at a peak current value a second region of negative resistance and thence a third region of positive resistance, load means connected in parallel with said diode exhibiting a non-linear impedance characteristic and a current source for energizing said circuit effective to cause intersection of said characteristics in said third region.

19. In a circuit comprising a tunnel diode exhibiting a potential-current characteristic defining a first region of positive resistance over a low range of potentials and adjoining at a peak current value a second region of negative resistance and thence a third region of positive resistance, means connected in parallel with said diode exhibiting a non-linear impedance characteristic including a relatively constant resistance portion extending beyond the first region of said diode characteristic and a current source for energizing said circuit effective to cause intersection of said characteristics in said third region.

20. In a circuit comprising a tunnel diode exhibiting a potential-current characteristic defining a first region of positive resistance over a low range of potentials and adjoining at a peak current value a second region of negative resistance and thence a third region of positive resistance, load means connected in parallel with said diode exhibiting a non-linear impedance characteristic including a relatively constant value of resistance for a predetermined range of potential and a current source for energizing said circuit effective to cause intersection of said characteristics in the first and third regions of said diode characteristic.

21. The circuit of claim 20, including means for controllably varying the impedance of said load.

22. The circuit of claim 21, wherein said load is a semiconductor.

23. In a circuit comprising a tunnel diode exhibiting a potential-current characteristic defining a first region of positive resistance over a low range of potentials and adjoining at a peak value of current and a first predetermined potential a second region of negative resistance and adjoining at a second predetermined potential and a comparably lower current a third region of positive resistance, an impedance connected in series with said tunnel diode, a non-linear load impedance connected in parallel with the series circuit of said tunnel diode and impedance, and exhibiting a substantially constant impedance over a low range of potentials, and a current source for energizing said circuit to cause intersection of said characteristics in said first and third regions.

24. The circuit of claim 23, including means for controllably altering the impedance of said non-linear load.

25. The circuit of claim 24, wherein said load is a semiconductor.

26. In combination with a logical circuit whose output varies between one voltage level during performance of its intended logical function and another voltage level during non-performance of said function, a circuit device exhibiting tunnelling phenomena and having a negative resistance operating region between a relatively low voltage first positive resistance operating region and a higher voltage second positive resistance operating region whereby a voltage amplification is provided, means including an impedance connected in series with said circuit device and a source for applying a current to said impedance and said circuit device for placing said circuit device at an operating point in one of the higher current region of said first positive resistance operating region and the lower current region of said second positive resistance operating region, means connecting the output of said logical circuit to one terminal of said device to shift the operation of said device between said operating point in one of said positive resistance regions and said operating point in the other of said positive resistance regions in response to said one and said other voltage level outputs respectively of said logical circuits, and means deriving an output across said impedance.

27. In the circuit set forth in claim 26, said signal responsive variable impedances and said negative resistance device all comprising tunnel diodes.

28. A signal switching and inverting circuit comprising, a plurality of signal responsive variable impedances connected essentially in parallel between one terminal of a source of potential and a common junction, a fixed impedance and a negative resistance device connected in series between another terminal of said source of potential and said junction, and an output terminal coupled to the connection between said impedance and said device.

References Cited by the Examiner

UNITED STATES PATENTS

| | | | |
|---|---|---|---|
| 2,614,140 | 10/1952 | Kreer | 307—88.5 |
| 2,651,728 | 9/1953 | Wood | 307—88.5 |
| 2,666,816 | 1/1954 | Hunter | 307—88.5 |
| 2,724,061 | 11/1955 | Emery | 307—88.5 |

OTHER REFERENCES

Pub. I: Radio-Electronic Engineering, April 1953, pages 8–10.

ARTHUR GAUSS, *Primary Examiner.*

GEORGE N. WESTBY, *Examiner.*